(12) United States Patent  
Jiang et al.

(10) Patent No.: US 8,898,390 B2
(45) Date of Patent: Nov. 25, 2014

(54) SCHEDULING WORKLOADS BASED ON CACHE ASYMMETRY

(75) Inventors: Xiaowei Jiang, Hillsboro, OR (US); Li Zhao, Beaverton, OR (US); Ravishankar Iyer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 13/042,547

(22) Filed: Mar. 8, 2011

(65) Prior Publication Data

US 2012/0233393 A1 Sep. 13, 2012

(51) Int. Cl.
*G06F 13/18* (2006.01)
*G06F 12/08* (2006.01)
*G06F 9/48* (2006.01)
*G06F 9/46* (2006.01)

(52) U.S. Cl.
CPC .......... *G06F 12/0842* (2013.01); *G06F 9/4881* (2013.01); *G06F 9/46* (2013.01)
USPC ............ 711/118; 711/120; 711/137; 711/170

(58) Field of Classification Search
USPC ................................. 711/118, 120, 137, 170
See application file for complete search history.

(56) References Cited

U.S. PATENT DOCUMENTS

| | | | |
|---|---|---|---|
| 6,223,256 B1 | 4/2001 | Gaither | |
| 6,360,299 B1 | 3/2002 | Arimilli et al. | |
| 6,829,679 B2 | 12/2004 | DeSota et al. | |
| 7,415,575 B1 | 8/2008 | Tong et al. | |
| 7,487,317 B1 * | 2/2009 | Fedorova et al. | ............. 711/168 |
| 7,496,716 B2 | 2/2009 | Dice et al. | |
| 7,725,657 B2 | 5/2010 | Hasenplaugh et al. | |
| 7,895,415 B2 | 2/2011 | Moses et al. | |
| 7,899,994 B2 | 3/2011 | Zhao et al. | |
| 2003/0177313 A1 | 9/2003 | Iyer et al. | |
| 2005/0114605 A1 | 5/2005 | Iyer | |
| 2006/0143390 A1 | 6/2006 | Kottapalli | |
| 2007/0006230 A1 | 1/2007 | Neiger et al. | |
| 2008/0016278 A1 | 1/2008 | Clark et al. | |
| 2008/0022049 A1 | 1/2008 | Hughes et al. | |
| 2008/0075101 A1 | 3/2008 | Illikkal et al. | |
| 2008/0133842 A1 | 6/2008 | Raikin et al. | |
| 2008/0195849 A1 | 8/2008 | Gonzalez et al. | |
| 2008/0235487 A1 | 9/2008 | Illikkal et al. | |
| 2008/0250415 A1 | 10/2008 | Illikkal et al. | |
| 2009/0089564 A1 | 4/2009 | Brickell et al. | |

OTHER PUBLICATIONS

Tong Li, et al., "Operating System Support for Overlapping-ISA Heterogeneous Multi-core Architectures," Jan. 6, 2010, pp. 1-12.

Chuanxiong Guo, "SRR: An O(1) Time Complexity Packet Scheduler for Flows in Multi-Service Packet Networks," May 25, 2002, pp. 1-24.

(Continued)

*Primary Examiner* — Jae Yu
(74) *Attorney, Agent, or Firm* — Trop, Pruner & Hu, P.C.

(57) ABSTRACT

In one embodiment, a processor includes a first cache and a second cache, a first core associated with the first cache and a second core associated with the second cache. The caches are of asymmetric sizes, and a scheduler can intelligently schedule threads to the cores based at least in part on awareness of this asymmetry and resulting cache performance information obtained during a training phase of at least one of the threads.

18 Claims, 8 Drawing Sheets

(56) References Cited

OTHER PUBLICATIONS

Gil Neiger, et al., "Intel Virtualization Technology: Hardware Support for Efficient Processor Virtualization," Aug. 10, 2006, pp. 167-179.

Volkmar Uhlig, et al, "Peformance of Address-Space Multiplexing on the Pentium," 2002, pp. 1-15.

Aravind Menon, et al., "Diagnoging Performance Overheads in the Xen Virtual Machine Environment," Jun. 2005, pp. 1-11.

* cited by examiner

SCHEDULING WORKLOADS BASED ON CACHE ASYMMETRY

BACKGROUND

Over time, processor technology has advanced such that modern processors often include multiple cores, along with associated circuitry such as one or more cache levels to store recently used or frequently accessed information, memory controllers and so forth. Software has also advanced such that much software is written to take advantage of the multi-threading capabilities of modern processors.

One type of multiprocessor is a chip multiprocessor (CMP) in which multiple cores are present and multiple threads can execute concurrently on one or more of these cores. Originally, such chip multiprocessors were of a symmetrical design such that each core was of the same architecture and the corresponding caches were also of the same size. However, a trend has emerged to incorporate heterogeneous resources in a processor.

DETAILED DESCRIPTION

As technology advances, processors are expected to appear with more heterogeneous resources including different types of cores and other processing engines, and corresponding cache memories that may be of asymmetric design. Thus, cache asymmetry is one aspect of heterogeneous CMP computing, and may provide reduced power and area while maintaining competitive performance as compared to a conventional symmetric cache arrangement. One challenge with an asymmetric cache CMP design is that an operating system (OS) scheduler is unaware of the asymmetry in cache space across the cores. As a result, naïve scheduling may end up scheduling an application that requires a large cache on a core that is coupled to a small cache.

Embodiments may be used to perform scheduling that is aware of asymmetric cache structures of a processor. In this way, performance may be improved as threads can be directed to execute on cores that are associated with a cache having a size suitable for the thread's workload. In various embodiments, combinations of hardware, software, and firmware may be used to perform cache asymmetry-aware scheduling.

Figure 1:
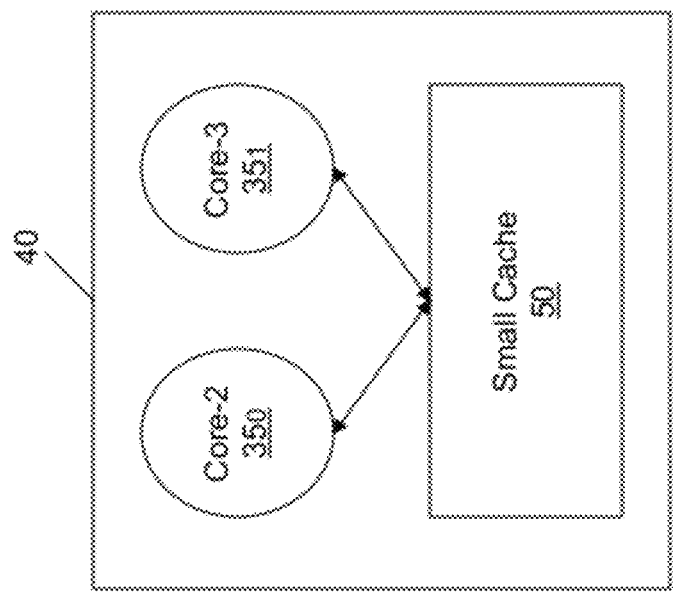
FIG. 1 is a block diagram of a processor in accordance with one embodiment of the present invention.
Figure 1:
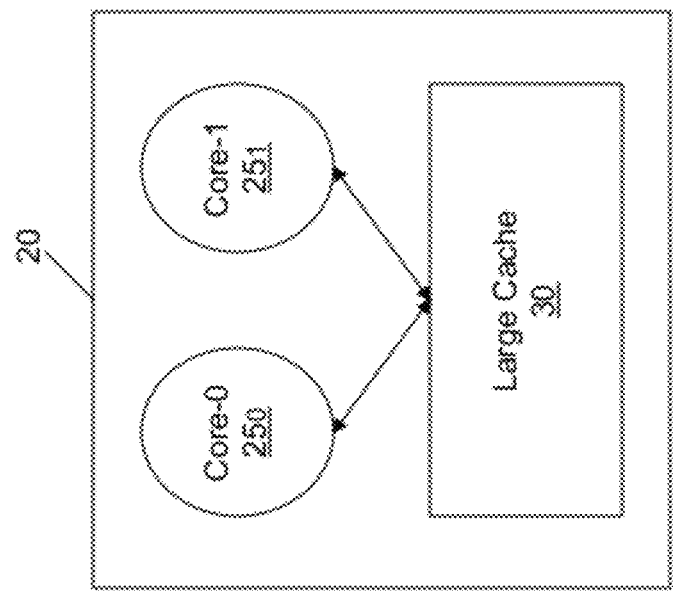

Referring now to FIG. 1, shown is a block diagram of a processor in accordance with one embodiment of the present invention. More specifically, processor 10 of FIG. 1 is a chip multiprocessor (CMP) that includes a plurality of cores. More specifically, CMP 10 is an asymmetric processor having a first processor domain 20 and a second processor domain 40, which may be asymmetric domains. In some embodiments, different types of cores may be present in these different domains. For example, cores in domain 40 may be smaller processors having a relatively simple, e.g., in-order pipeline design, while instead the processor cores of domain 20 may be larger, more complex processors such as out-of-order processor cores. In addition, as seen in these different domains, asymmetrically sized caches may be present.

Still referring to FIG. 1, first domain 20, which includes multiple processor cores $25_0$ and $25_1$, may be coupled to a cache 30, which may be of a relatively large size. In one embodiment, each core 25 may include one or more levels of private caches, e.g., level 0 and level 1 caches. In turn, each core may be coupled to large cache 30, which may be a last level cache (LLC). For example, in one embodiment LLC 30 may be a 4 megabyte (MB) cache memory. In different implementations and under different workloads, LLC 30 may be a shared cache or it can be a private cache of one of the cores, depending upon a given operating environment.

Also seen in FIG. 1, second domain 40, which includes multiple processor cores $35_0$ and $35_1$, may be coupled to a cache 50, which may be of a relatively small size. In one embodiment, each core 35 may include one or more levels of private caches, e.g., level 0 and level 1 caches. Each core of these may be coupled to small cache 50, which may be a LLC. For example, in one embodiment LLC 50 may be a 512 kilobyte (kB) cache memory. In different implementations and under different workloads, LLC 50 may be a shared cache or it can be a private cache of one of the cores, depending upon a given operation environment.

To realize scheduling in accordance with an embodiment of the present invention a predictor, also referred to as a performance engine, may be present in or associated with a last-level cache subsystem and can be leveraged, along with an asymmetric cache-aware OS scheduler. As will be described further below, the performance engine may be implemented using hardware support to measure cache performance of a task on each of multiple asymmetric cache sizes supported in the platform. In one embodiment, the collected statistics from this performance engine then may be exposed to the OS through the use of machine specific registers (MSRs).

The performance engine may be enabled by the scheduler to measure a thread's cache performance during a training phase. In general, the training phase may begin on thread initiation on a given core to which the thread is initially assigned. During this training phase, which may be an initial portion of the thread execution, e.g., approximately 5% of a thread's execution time, various metrics may be determined using the performance engine. Then, at a conclusion of the training phase, the scheduler may intelligently determine a most suitable thread-to-core/cache mapping based on the collected data, and thus schedule the thread to its appropriate core/cores (e.g., where multiple cores are associated with a given cache).

At this time, the thread may enter an execution phase, which may continue from this scheduling point until a conclusion of the thread. Thus in general, this execution phase may correspond to approximately 95% of a thread's execution time. As will be discussed further below, in various embodiments the scheduler may inherently be an O(1) scheduling algorithm, and thus can be executed efficiently and linearly. Furthermore, embodiments of the scheduler may handle scheduling of threads in an asymmetric cache-aware manner both in cases of a private cache implementation, as well as a shared cache implementation in which cache contention is present. Of course, a given system may dynamically switch between shared and private caches, e.g., based on a current workload on the associated cores.

Figure 2:
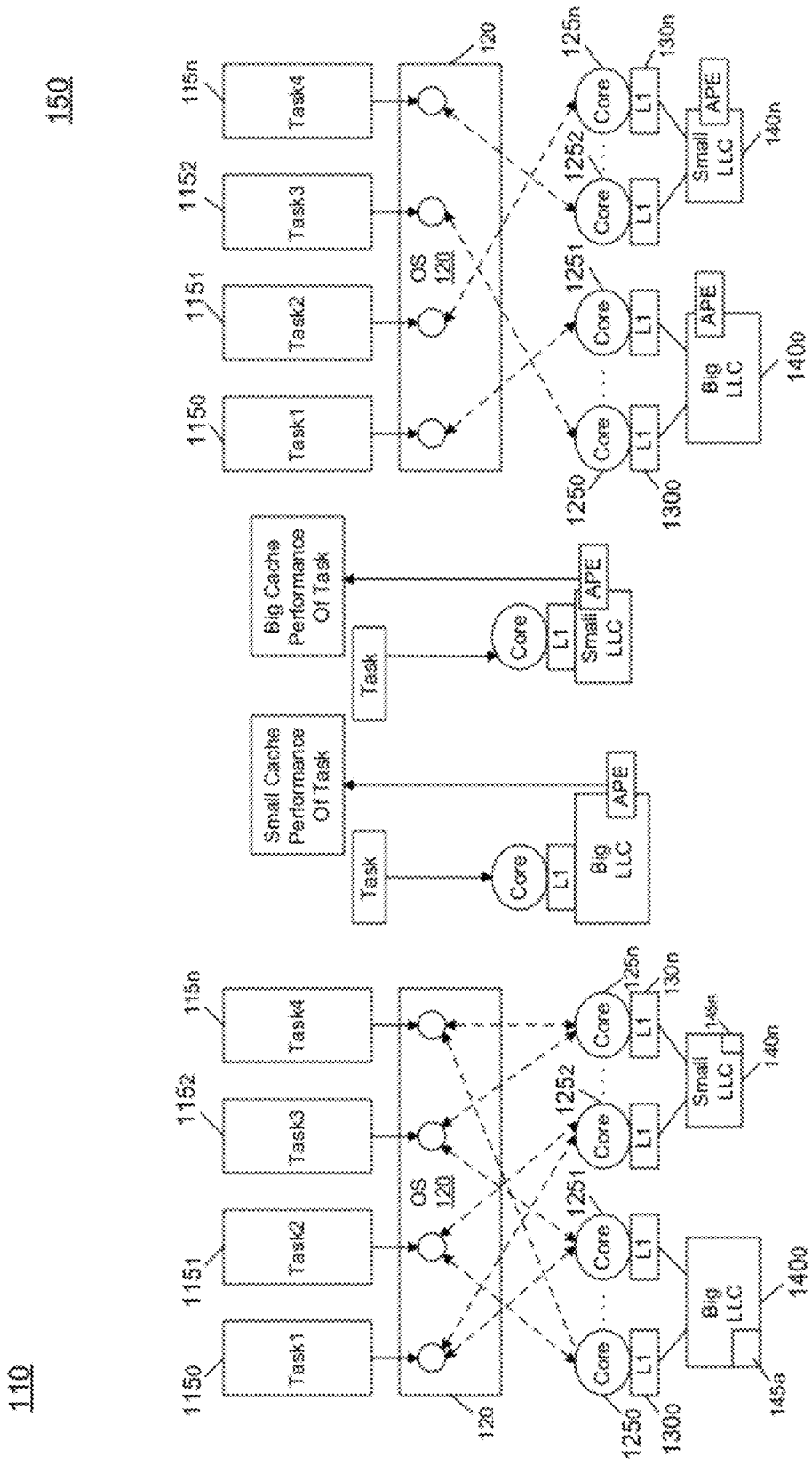
FIG. 2 is a graphical representation of execution of multiple threads in a training phase and an execution phase in accordance with one embodiment of the present invention.

Referring now to FIG. 2, shown is a graphical representation of execution of multiple threads in a training phase and an execution phase. Specifically, FIG. 2 shows that initially a training phase 110 occurs in which various tasks, e.g., threads $115_0$-$115_n$, may be scheduled to different cores $125_0$-$125_n$ by an OS scheduler 120. More specifically, with respect to the asymmetric caches present in the different domains shown in FIG. 2, each of one or more performance engines may be able to simulate cache performance on different cache sizes available in the platform. Thus assume that a first task $115_0$ is scheduled to core $125_b$ that is coupled via a cache $130_0$ to a large LLC $140_0$. Using a performance engine $145_a$, in addition to deriving cache performance metrics as to execution of this task on LLC $140_0$, cache performance information that simulates execution of the task on one of cores $125_2$ and $125_n$ that instead are coupled to a smaller LLC $140_n$ may also be derived. Thus the performance engine both measures cache performance (e.g., for a cache the thread uses) and predicts cache performance (e.g., for a different cache that the thread is not using).

In similar manner, a second task $115_1$ is scheduled on core $125_1$ may have cache performance metrics derived for its execution on cache $140_0$ as well as its potential execution, via core $125_2$, on cache $140_n$.

Similarly, execution of a task on one of cores $125_2$ and $125_n$ coupled to smaller LLC $140_n$ may derive cache performance characteristics, both for execution on that LLC, as well as its simulated execution on a core that uses larger cache $140_0$. Thus in the representation of FIG. 2, a task $115_n$ that executes on core $125_n$ that uses small cache $140_n$ can, via performance engine $145_n$ associated with this cache, in addition to cache performance on this cache $145_n$ itself, predict cache performance of the task on the large LLC $140_0$.

Based on the evaluations performed via the performance engines, OS scheduler 120 may allocate tasks to be performed during an execution phase 150 to the cores associated with the different last level caches based on the performance metric information. Thus as seen, threads $115_0$ and $115_1$ may be scheduled on cores $125_0$ and $125_1$ that execute using cache $140_0$. In turn, threads $115_1$ and $115_n$ may be scheduled on cores $125_2$ and $125_n$ that execute using cache $140_n$.

As will be described further below, the performance engines may operate by sending cache requests to the LLC and to a set of shadow tag arrays present in the caches for simulating the cache performance for a desired cache size. In the case that 2 cores share an LLC, to measure the performance of an application running alone on a large (e.g., 4 MB) and a small (e.g., 512 KB) cache, a performance engine can incorporate for each LLC multiple shadow tag arrays that take into account all cache sizes in the underlying asymmetric cache platform. The number of shadow tag arrays present may equal the product of the number of cores coupled to a given last level cache and the various cache sizes to be simulated (which may correspond to the number of different last level cache sizes present in the system), in one embodiment. To minimize the area and power overheads, a performance engine in accordance with an embodiment may apply a set sampling technique. As one example, only 1/256 sets of a desired cache size can be used. As such, only cache accesses that match these sets are sent to the shadow tags. Moreover, the shadow tags may only be accessed during a thread's training phase, which in some embodiments may be less than 1% of its execution time. The use of set sampling may have an accuracy greater than approximately 98%.

Figure 3:
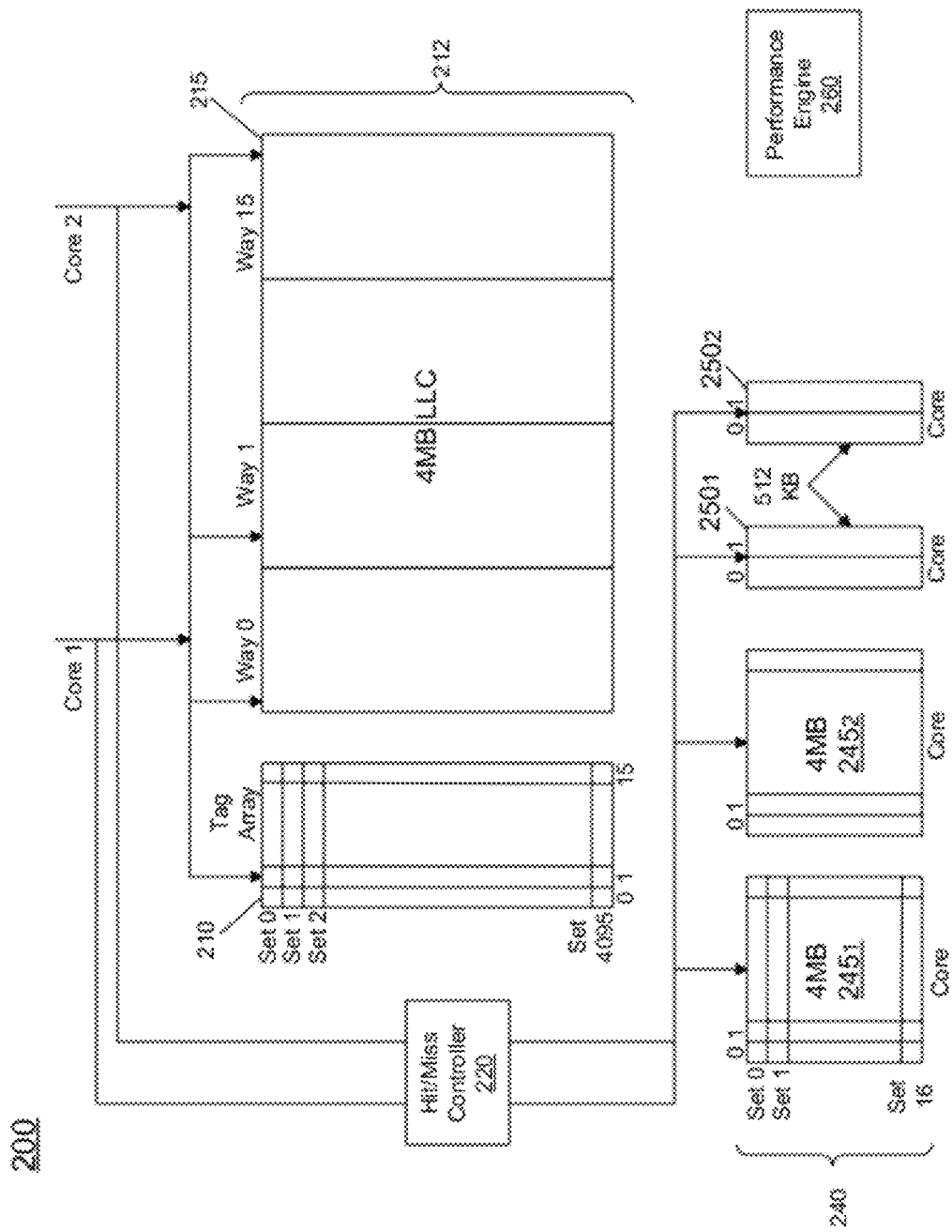
FIG. 3 is a block diagram of the design of a performance engine in accordance with an embodiment of the present invention.

FIG. 3 illustrates the design of a performance engine in accordance with an embodiment of the present invention. As seen in FIG. 3, a cache memory 200 which may be a last level cache, includes various tag and data arrays for handling data storage a performance engine 260 and a controller 220. More specifically, a main portion 212 includes a tag array 210 and a data array 215. In addition to these main arrays, cache 200 further includes a shadow portion 240 that includes, for each cache size present in the system, a given shadow tag array for each corresponding core associated with the LLC and data array size. A shadow tag array may be functionally similar to a conventional cache array with the exception that it does not include a corresponding data array. These shadow tag arrays thus model operation of a thread on a given cache. Thus as seen, for the 4 MB size data array 215 of main portion 212, a first shadow tag array $245_1$ and a second shadow tag array $245_2$ are present. Similarly, for a smaller, e.g., 512 KB cache size also present in the system, a first shadow tag array $250_1$ and a second shadow tag array $250_2$ are also present. Thus in various embodiments of a performance engine, one or more shadow tag arrays may be provided to measure the cache performance of a thread on caches that have different sizes.

Incoming requests from the multiple cores that are coupled to this cache memory may be provided both to the main portion 212 and to a hit/miss controller 220. These requests are provided from controller 220 to the corresponding shadow tag arrays. More specifically, when controller 220 determines that a request occurs in a corresponding set that is present in the samples of the shadow tag arrays, these requests are provided to the shadow tag arrays for accessing the corresponding set and way, and updating corresponding hardware performance counters.

Figure 4:
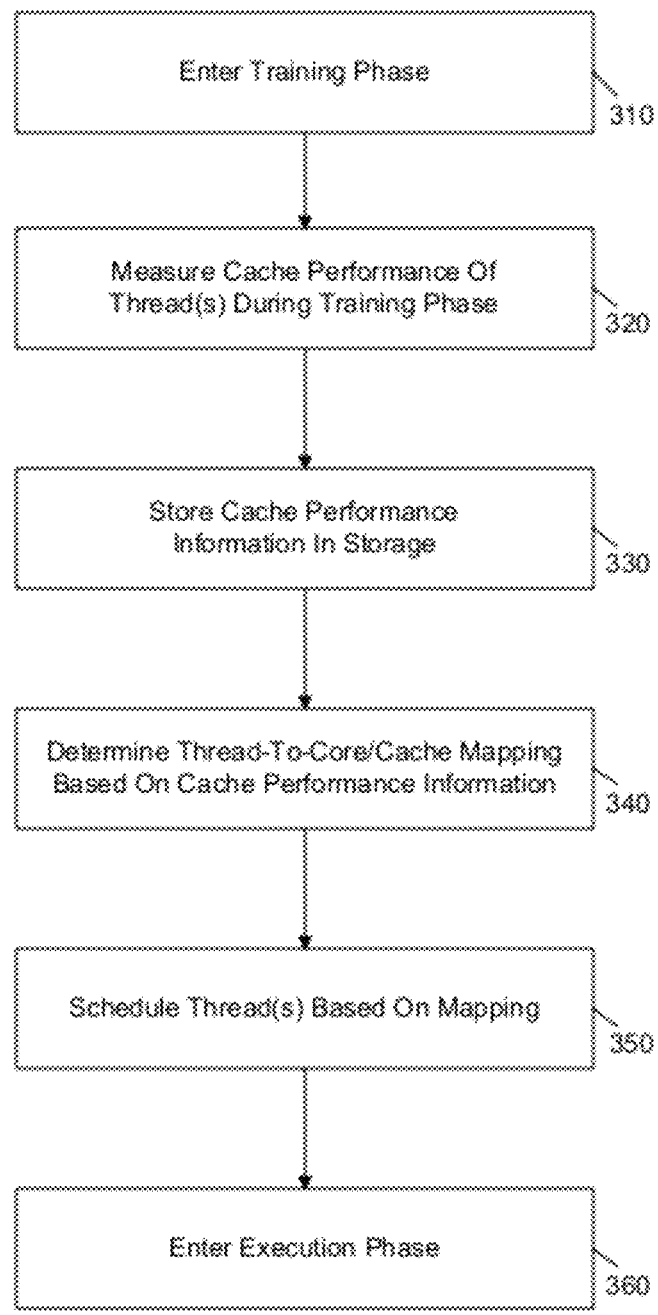
FIG. 4 is a flow diagram of a method in accordance with one embodiment of the present invention.

Referring now to FIG. 4, shown is a flow diagram of a method in accordance with one embodiment of the present invention. More specifically, method 300 of FIG. 4 shows a high-level view of a scheduling method. Method 300 may be implemented via an OS scheduler, namely a scheduler that is aware of a cache asymmetry present in the system, and which may instruct a performance engine or other predictor to obtain cache performance information to be used by the scheduler. Method 300 may begin at block 310 by entering a training phase. Such training phase may occur upon initial spawning of a thread.

More specifically, when a thread is initiated, the scheduler may assign it to a given core (without consideration of cache asymmetry) and at the same time initiate a performance engine of a cache with which the assigned core is associated. Thus at block 320, cache performance of the thread may be measured during this training phase. Various measures of cache performance can be obtained, both for the cache that the thread uses, as well as any other cache sizes available in the system. For example, a performance engine may determine cache metrics including a miss per instruction, as well as a number of misses occurring during the training phase. In addition other hardware performance counters can provide pipeline metrics such as instruction count. Note that this performance information may be obtained for the newly spawned thread, as well as any other threads executing on cores associated with the performance engine.

This cache performance information may be stored in a given storage (block 330). For example, some of the information may be stored in various MSRs, while other information may be stored in a table accessible by the OS scheduler. For example, a table may be present that includes entries for each thread that can store various cache performance information including the MPI information, total number of misses and so forth, for the various cache sizes. At this time, the training phase may thus be completed as the information to be used for scheduling of the thread has been obtained and stored.

Accordingly, control passes to block 340 where thread-to-core/cache mapping may be determined based on the cache performance information. That is, the scheduler may use the information obtained to determine an appropriate cache mapping. Control then passes to block 350 where one or more threads may be scheduled to a given core (and which is associated with the cache of the mapping) based on this mapping. Accordingly at this point the given thread or threads have been appropriately scheduled and a thread may pass to an execution phase (block 360) in which the remaining workload of the thread can be performed on the scheduled core. Note that while described with this high level in the embodiment of FIG. 4, the scope of the present invention is not limited in this regard. For example, during the execution phase it is possible that the thread may be migrated to another core based on various other workload considerations, e.g., as a result of other threads and the interactions therebetween.

Figure 5:
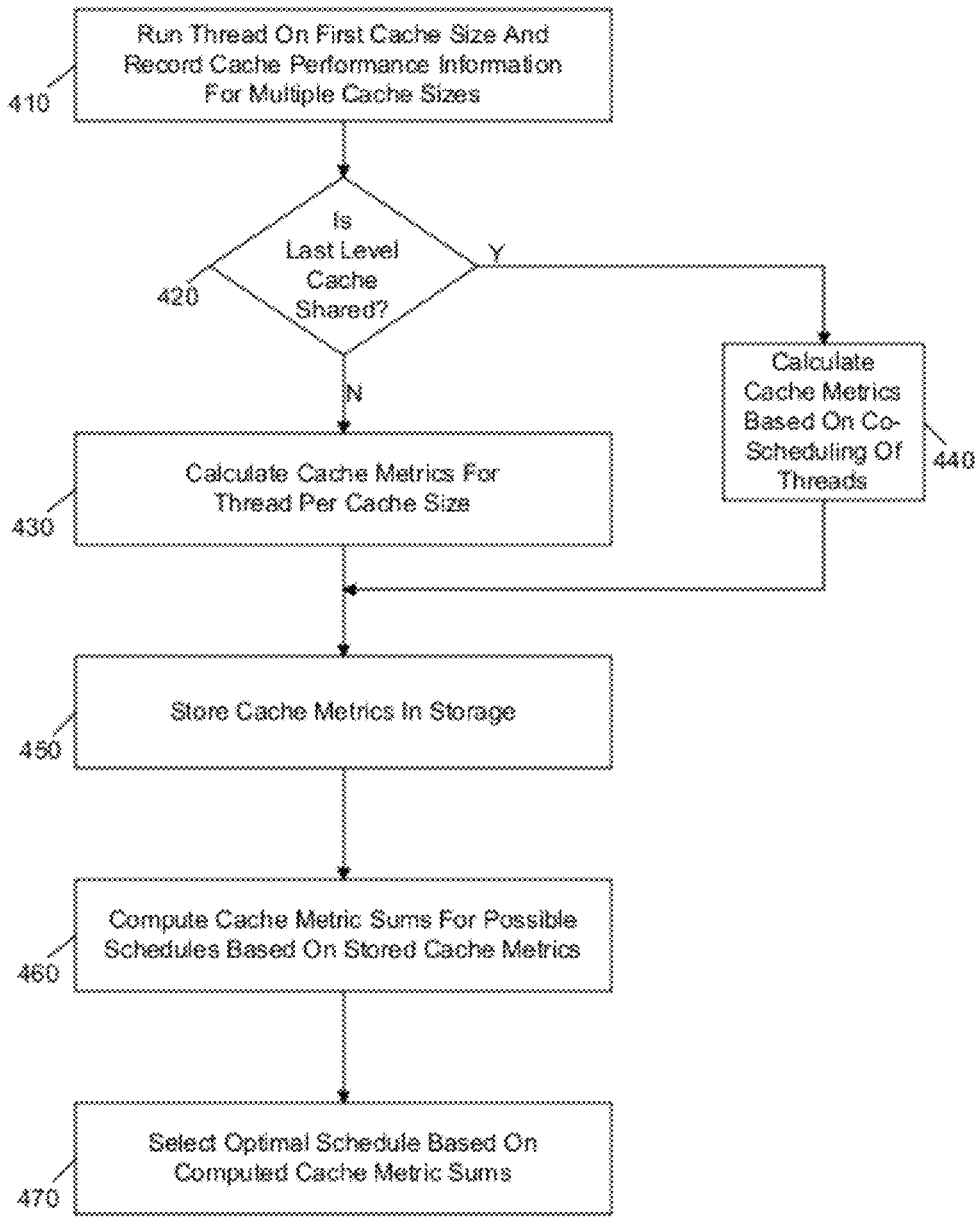
FIG. 5 is a flow diagram of a scheduling operation in accordance with an embodiment of the present invention.

Furthermore, understand that the discussion above with regard to FIG. 4 is at a high level. For further details regarding the determination of scheduling performed by the scheduler, reference can be made to FIG. 5, which is a flow diagram of a scheduling operation in accordance with an embodiment of the present invention. Referring now to FIG. 5, method 400 may be performed by the scheduler in scheduling a thread for execution on a given core based on its awareness of cache asymmetry.

As seen in FIG. 5, method 400 may begin by running the thread on a first cache size and recording cache performance information for multiple cache sizes (block 410). That is, as discussed above the scheduler may instruct a performance engine to obtain information regarding cache performance for a thread that is executing on a core. More specifically, although this thread may use a single LLC that is associated with the core on which the thread is executing, cache performance information for the multiple LLC cache sizes available in the system can be obtained.

Control passes next to diamond 420 where it may be determined whether this last level cache is operating as a shared cache. If not, control passes to block 430 where cache metrics can be calculated for the thread per cache size. That is, because in this case the LLC acts as a private cache, it is possible to calculate cache metrics for the thread without regard to any interaction with other threads.

If instead it is determined that the last level cache is a shared cache, control passes to block 440 where the cache metrics may be calculated based on co-scheduling of multiple threads to that cache and consideration of replacement of a thread's lines by other co-scheduled threads. In either event, control passes next to block 450 where the cache metrics may be stored in a storage. Control then passes to block 460 where cache metric sums may be computed for the possible schedules based on the stored cache metrics. As discussed above, in a private cache situation only several schedules are possible. In contrast, additional possible schedules can be available in a shared cache situation. Embodiments may limit the possibilities to provide for efficient and low overhead scheduling, e.g., of O(1) complexity. Finally, control passes to block 470 where an optimal schedule may be selected based on the computed cache metric sums. Accordingly, at this time the scheduler may schedule the threads to appropriate cores for an execution phase based on this optimal scheduling.

As described above, in the training phase of a thread, the performance engine may be enabled by the OS scheduler to measure the thread's cache performance. In one embodiment, threads are trained on cores/caches where they are spawned initially. At the end of the training phase, one or more cache metrics can be calculated based on cache statistics reported by the performance engine and associated with the thread's task structure. Then to determine an optimal mapping, the scheduler may calculate a plurality of cache metric sums each for a given schedule as follows:

$$CM_{sum} = \sum_{Threads\_on\_L} CM_{Thread_i} + \sum_{Threads\_on\_S} CM_{Thread_i}. \quad [\text{EQ. 1}]$$

when $CM_{sum}$ is a sum of a cache metric for a schedule in which a summation of the cache metrics (CM) for a set of threads using a first, e.g., large cache (Threads_on_L), is combined with a summation of the cache metrics for a set of threads using a second, e.g., small cache (Threads_on_S).

One example of a cache metric is a miss per instruction (MPI). More specifically a MPI of each thread for each cache size ($<MPI_{threadi\_L}, MPI_{threadi\_S}>$, where L and S are respectively large and small caches) can be calculated based on cache statistics reported by the performance engine and associated with the thread's task structure. To determine the thread-to-core/cache mapping (e.g., schedule) that yields the best overall performance, a scheduler may sort out a sum of MPIs for all possible schedules, where:

$$MPI_{sum} = \sum_{Threads\_on\_L} MPI_{Thread_i} + \sum_{Threads\_on\_S} MPI_{Thread_i}. \quad [\text{EQ. 2}]$$

In practice, the threads' schedule that has the smallest $MPI_{sum}$ leads to the best overall performance.

Different implementations can be used for cases where the last level asymmetric caches are either shared or private. When a LLC (either large or small) is exclusively used by one thread, the obtained $<MPI_{threadi\_L}, MPI_{threadi\_S}>$ from one schedule can be directly used for any schedule, since it remains constant across different schedules. Thus the $MPI_{sum}$ of each possible schedule can be calculated based on all $<MPI_{threadi\_L}, MPI_{threadi\_S}>$ and the schedule that yields the lowest $MPI_{sum}$ may be selected. In a 2 thread (T1 and T2 example) the following two schedules can be compared:

(1) T1 on large cache, T2 on small cache; and (2) T1 on small cache, T2 on large cache.

When an LLC (either size) is shared among threads, the effect of cache contention can also be considered in selecting a schedule. That is, in this situation, $<MPI_{threadi\_L}, MPI_{threadi\_S}>$ obtained from one schedule cannot be directly applied to other schedules like in the private cache case, because the MPI of a thread will change when it is co-scheduled with another thread on the same cache. Moreover, the degree of such change may vary with respect to the thread that it is co-scheduled with.

To solve this issue, the power law of cache misses may be used. Mathematically, it states that if $MR_0$ is the miss rate of a thread for a baseline cache size $C_0$, the miss rate (MR) for a new cache size C can be expressed as:

$$MR = MR_0 \left(\frac{C}{C_0}\right)^{-a} \quad [\text{EQ. 3}]$$

where $\alpha$ is a measure of how sensitive the thread is to changes in cache size. Based on this, a power law for cache MPIs may be derived as follows.

$$MPI = MPI_0 \left(\frac{C}{C_0}\right)^{-a} \quad [\text{EQ. 4}]$$

Since information regarding $<MPI_{threadi\_L}, MPI_{threadi\_S}>$ of all threads may be obtained from the performance engine, a for each thread can be calculated as follows:

$$\alpha = -\log_{\frac{C_L}{C_S}} \frac{MPI_{threadi\_l}}{MPI_{threadi\_s}} \quad [\text{EQ. 5}]$$

When two threads share a cache, they may replace each other's cache lines and hence change their cache occupancy. Accordingly, the cache occupancy of a thread i when it shares a LLC with another thread j can be calculated as follows:

$$\text{Occupancy}_{threadi\_j} = \frac{\text{miss\_num}_i \times PROB_{i\_replace\_j}}{\text{miss\_num}_i \times PROB_{i\_replace\_j} + \text{miss\_num}_j \times PROB_{j\_replace\_i}} \quad [\text{EQ. 6}]$$

$$\approx \frac{\text{miss\_num}_i}{\text{miss\_num}_i + \text{miss\_num}_j} \quad [\text{EQ. 7}]$$

where miss_num corresponds to a number of cache misses by a given thread and PROB corresponds to a probability that a first thread will replace a line of a second thread. The miss_num of each thread may also be measured by the performance engine. Finally, the adjusted MPI of each thread i when it is co-scheduled with another thread j on the same LLC can be expressed as:

$$MPI_{threadi\_j} = MPI_{threadi\_i} \text{Occupancy}_{threadi\_j}^{-a}. \quad [\text{EQ. 8}]$$

Similar to the private cache case, a scheduler in accordance with an embodiment of the present invention may sort out the $MPI_{sums}$ and select the schedule that yields the smallest $MPI_{sum}$. Thus the scheduler computes the $MPI_{sum}$ of each schedule and selects the smallest one, and accordingly schedules corresponding threads per the selected $MPI_{sum}$.

In a given system with a large number of cores and caches, with threads executing concurrently, this analysis may involve non-negligible computing and sorting efforts. Moreover, an unbounded number of thread migrations may occur based on the scheduling. To mitigate this overhead, a scheduler in accordance with various embodiments may have a constant O(1) compute and sort complexity.

Specifically, the scheduler may limit its analysis to three cases of thread events to be handled: (1) when a thread arrives (namely, it finishes training and is to be mapped to a proper cache/core); (2) when a thread exits; or (3) when a program phase change occurs. Note that a phase change can alternatively be considered as an old thread exiting from the system and a new thread arriving. The scheduler operation on a thread exiting can be handled similarly to thread arrival.

Thus all of the above scenarios can be handled by the same consideration, namely an arriving thread. When a thread arrives, the scheduler decides where to map the thread by analysis of the following six cases (assuming an implementation with two asymmetrically sized caches):

(1) The new thread is scheduled on the large cache;
(2) The new thread is scheduled on the large cache, and a candidate thread from the large cache is migrated to the small cache;
(3) The new thread is scheduled on the large cache, and a candidate thread from the large cache is swapped with another candidate thread from the small cache;
(4) The new thread is scheduled on the small cache;
(5) The new thread is scheduled on the small cache and a candidate thread from the smaller cache is migrated to the large cache; and
(6) The new thread is scheduled on the small cache and a candidate thread from the large cache is swapped with another candidate thread from the small cache.

The best candidate may be obtained by comparing the difference between the best schedule and the second-best schedule including which threads are to be migrated in order to arrive at this second-best schedule. In other words, to arrive at the second best schedule, it may be determined which threads need to be migrated correspondingly. Consequently, when a new thread arrives, the scheduler determines a best mapping to core/cache based on the current best schedule (best within case 1-6) and second-best schedule (second-best within case 1-6). Meanwhile, as seen above the number of potential migrations is also limited (3 migrations at most). To compute the best mapping of a thread, a constant amount of computation occurs, thus explaining the nature of O(1) complexity of a scheduler in accordance with a given embodiment.

Figure 6:
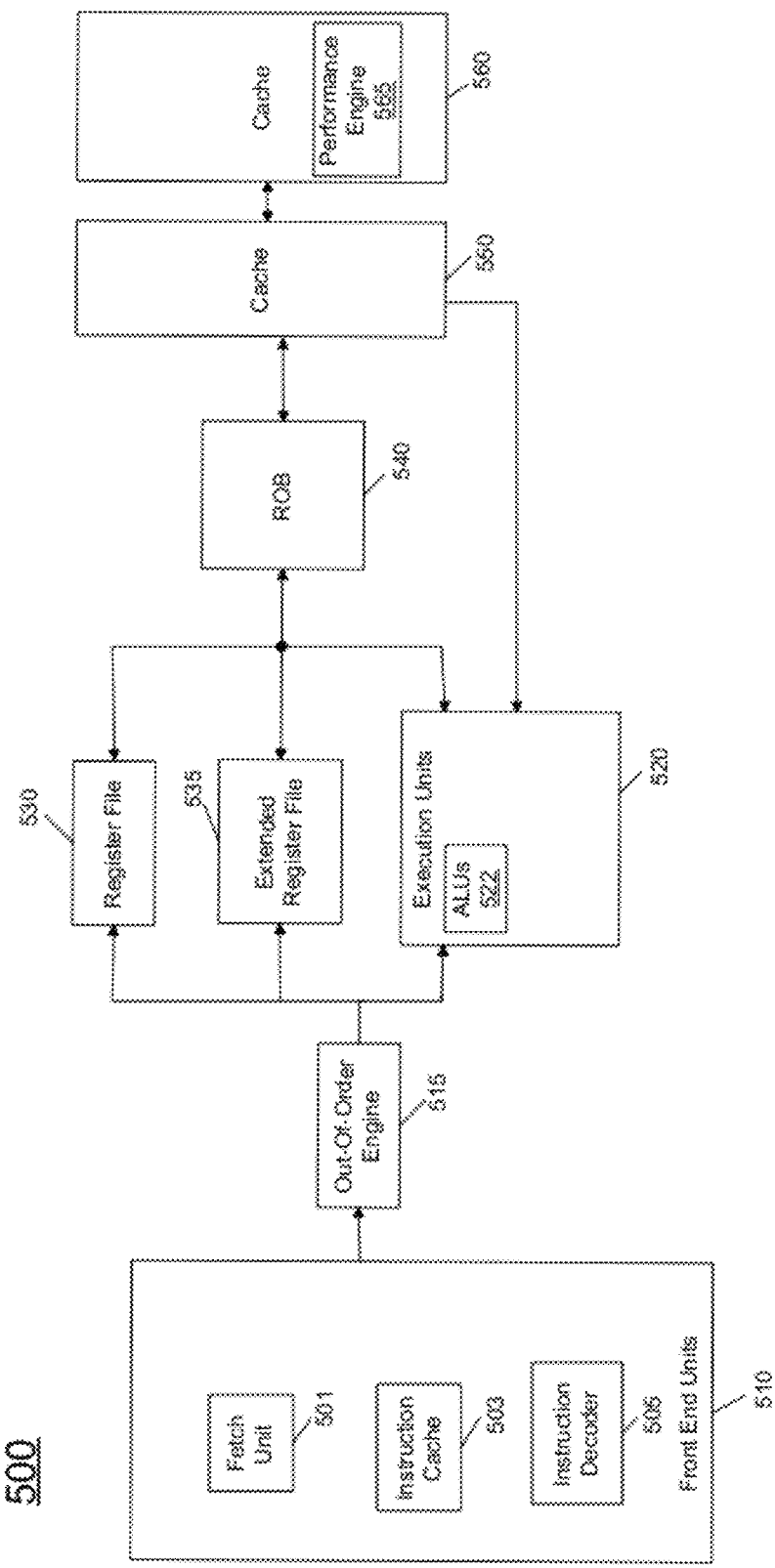
FIG. 6 is a block diagram of a processor core in accordance with one embodiment of the present invention.

Embodiments can be incorporated in many different processors. Referring now to FIG. 6, shown is a block diagram of a processor core in accordance with one embodiment of the present invention. As shown in FIG. 6, processor core 500 may be a multi-stage pipelined out-of-order processor. Processor core 500 is shown with a relatively simplified view in FIG. 6 to illustrate various features used in connection with cache performance hardware in accordance with an embodiment of the present invention. As shown in FIG. 6, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 6, ROB 540 is coupled to a cache 550, (e.g., an L1 cache). Also, execution units 520 can be directly coupled to cache 550. From cache 550, data communication may occur still with higher level caches, system memory and so forth. For example, cache 550 may couple to a shared cache 560, which may be a LLC in accordance with one embodiment of the present invention that includes a performance engine 565.

Figure 7:
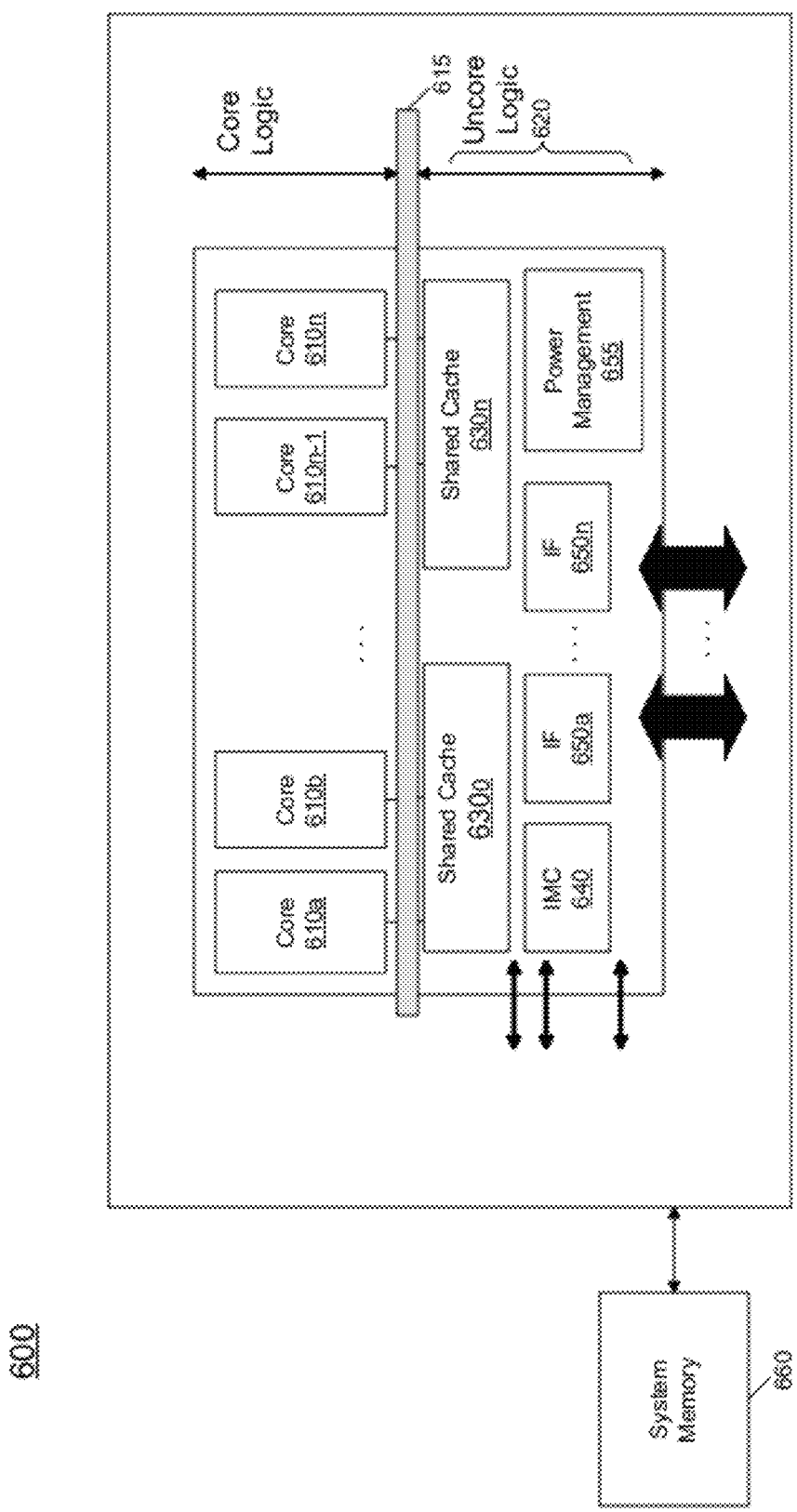
FIG. 7 is a block diagram of a processor in accordance with an embodiment of the present invention.

Referring now to FIG. 7, shown is a block diagram of a processor in accordance with an embodiment of the present invention. As shown in FIG. 7, processor 600 may be a multicore processor including a plurality of cores $610_a$-$610_n$. In one embodiment, each such core may be configured as core 500 described above with regard to FIG. 6. The various cores may be coupled via an interconnect 615 to an uncore 620 that includes various components. As seen, the uncore 620 may include shared caches $630_{0-n}$ which may be last level caches of asymmetrical sizes, and each having at least two cores coupled to it. In addition, the uncore may include an integrated memory controller 640, various interfaces 650 and a power management unit 655, which may determine an appropriate low power state in which to place a given core. In turn, power management unit 655 may generate a plurality of control signals to cause various components, both of a given core as well as other processor units to enter into a low power state. As seen, processor 600 may communicate with a system memory 660, e.g., via a memory bus. In addition, by interfaces 650, connection can be made to various off-chip components such as peripheral devices, mass storage and so forth. While shown with this particular implementation in the embodiment of FIG. 7, the scope of the present invention is not limited in this regard.

Figure 8:
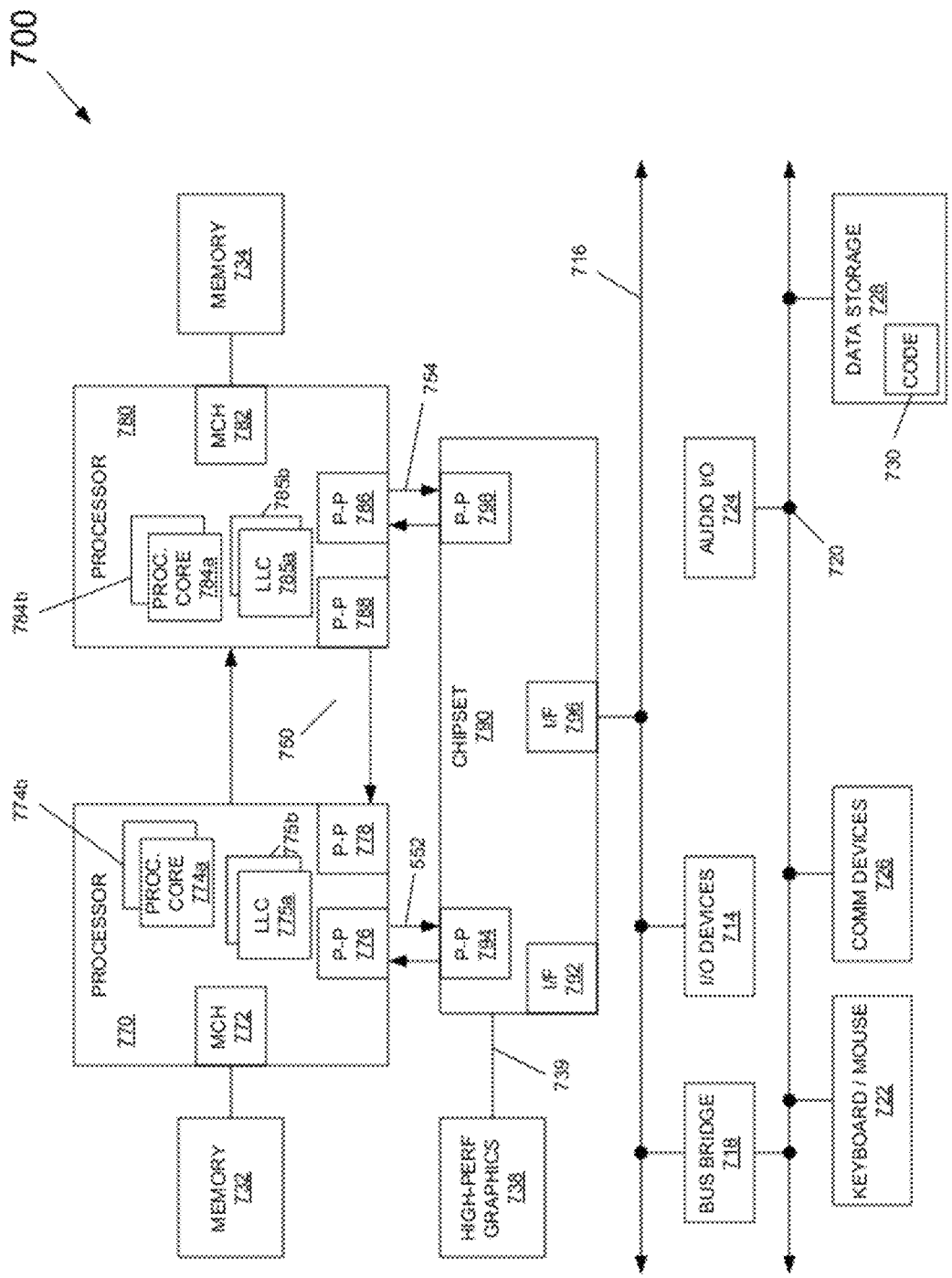
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 700 is a point-to-point interconnect system, and includes a first processor 770 and a second processor 780 coupled via a point-to-point interconnect 750. As shown in FIG. 8, each of processors 770 and 780 may be multicore processors, including first and second processor cores (i.e., processor cores 774a and 774b and processor cores 784a and 784b), although potentially many more cores may be present in the processors. As further seen, each processor may include multiple LLCs (e.g., LLCs $775_a$ and $775_b$ and LLCs $785_a$ and $785_b$), which can be of asymmetric size and including performance engines in accordance with an embodiment of the present invention.

Still referring to FIG. 8, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 8, MCH's 772 and 782 couple the processors to respective memories, namely a memory 732 and a memory 734, which may be portions of main memory (e.g., a dynamic random access memory (DRAM)) locally attached to the respective processors. First processor 770 and second processor 780 may be coupled to a chipset 790 via P-P interconnects 752 and 754, respectively. As shown in FIG. 8, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 8, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

Due to the awareness of underlying asymmetric cache architecture as well as a scheduling algorithm of an embodiment of the present invention, a speedup of between approximately 20-30% can be realized for multiple thread workloads. Thus rather than exhaustively testing every possible schedule and selecting the best performing schedule, embodiments may access cache statistics obtained via a performance engine and compute the best schedule with an O(1) scheduling algorithm.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a processor including a first cache and a second cache, a first core associated with the first cache and a second core associated with the second cache, the first and second caches asymmetric caches of a common cache level, wherein a scheduler is to schedule a plurality of threads to the first and second cores based at least in part on cache performance information obtained during a training phase of the plurality of threads on the asymmetric caches, and a predictor to predict cache performance of a first thread on the second cache during the training phase of the first thread on the first core using the first cache.

2. The apparatus of claim 1, wherein the first cache includes a first tag array and a corresponding data array, a second tag array to model operation of the first cache and a third tag array to model operation of the second cache, wherein the second and third tag arrays are a portion of the size of the first tag array and not having corresponding data arrays.

3. The apparatus of claim 2, wherein the predictor is to measure the cache performance of the first thread on the first cache and to predict the cache performance of the first thread on the second cache during the training phase, and to store the cache performance information for the first thread in a first storage of the processor.

4. The apparatus of claim 3, wherein the scheduler is to schedule the first thread to the first core or to the second core for an execution phase of the first thread following the training phase based on the cache performance information.

5. The apparatus of claim 1, wherein the scheduler is of O(1) complexity.

6. The apparatus of claim 5, wherein the scheduler is to consider a limited number of scheduling scenarios from a plurality of possible scheduling scenarios.

7. The apparatus of claim 6, wherein each of the limited number of scheduling scenarios includes a thread arrival to one of the first and second cores.

8. The apparatus of claim 1, wherein when the first and second caches are private caches, the scheduler is to calculate a first sum of miss rate values for use of the first cache by the first thread and use of the second cache by the second thread, and to calculate a second sum of miss rate values for use of the second cache by the first thread and use of the first cache by the second thread, and to schedule the first and second threads according to the smaller sum.

9. A method comprising:
initiating a thread on a first core of a processor;
measuring cache performance of the thread on a first cache used by the thread and predicting cache performance of the thread on a second cache unused by the thread, the first and second caches of asymmetric size, and storing cache performance information regarding the cache performance in a storage;
determining a thread-to-core mapping based on the cache performance information, including computing a sum for each of a plurality of possible schedules for the thread, a second thread, and a third thread on the first core, a second core associated with the second cache, and a third core associated with the second cache; and
scheduling the thread to the first core or the second core based on the thread-to-core mapping.

10. The method of claim 9, further comprising scheduling the thread to the first core or the second core based on the thread-to-core mapping.

11. The method of claim 10, further comprising executing the thread on the scheduled first or second core in an execution phase of the thread following a training phase in which the cache performance information is stored.

12. The method of claim 9, further comprising selecting a schedule from the plurality of possible schedules based on the sums.

13. The method of claim 12, further comprising selecting the schedule having a lowest sum, each sum corresponding to:

$CM_{sum} = \Sigma_{Threads\_on\_L} CM_{Thread_i} + \Sigma_{Threads\_on\_S} CM_{Thread_i}$, where CM is a cache metric of the cache performance information, Threads_on_L corresponds to a summation of the cache metric for a plurality of threads executing using the first cache, and Threads_on_S corresponds to a summation of the cache metric for a plurality of threads executing using the second cache.

14. A processor comprising:
a first cache;
a second cache;
a first core associated with the first cache;
a second core associated with the second cache, the first and second caches asymmetric caches of a common cache level; and
a scheduler to schedule a plurality of threads to the first and second cores based at least in part on cache performance information obtained during a training phase of the plurality of threads on the asymmetric caches, wherein when the first and second caches are private caches, the scheduler is to calculate a first sum of miss rate values for use of the first cache by a first thread and use of the second cache by a second thread, and to calculate a second sum of miss rate values for use of the second cache by the first thread and use of the first cache by the second thread, and to schedule the first and second threads according to the smaller sum.

15. The processor of claim 14, wherein the first cache includes a first tag array and a corresponding data array, a second tag array to model operation of the first cache and a third tag array to model operation of the second cache, wherein the second and third tag arrays are a portion of the size of the first tag array and not having corresponding data arrays.

16. The processor of claim 14, further comprising a predictor to predict cache performance of the first thread on the second cache during the training phase of the first thread on the first core using the first cache.

17. The processor of claim 16, wherein the predictor is to measure the cache performance of the first thread on the first cache and to predict the cache performance of the first thread on the second cache during the training phase, and to store the cache performance information for the first thread in a first storage of the processor.

18. The processor of claim 17, wherein the scheduler is to schedule the first thread to the first core or to the second core for an execution phase of the first thread following the training phase based on the cache performance information.

* * * * *